(12) United States Patent
Ricketts et al.

(10) Patent No.: US 12,565,792 B2
(45) Date of Patent: Mar. 3, 2026

(54) ADJUSTABLE DOOR ASSEMBLY FOR VEHICLE DOOR, VENTILATION SYSTEM FOR OFF-ROAD VEHICLE INCLUDING SAME, AND VEHICLE

(71) Applicant: Honda Motor Co., Ltd., Tokyo (JP)

(72) Inventors: Brandon E. Ricketts, Marysville, OH (US); Brian T. Walters, Delaware, OH (US)

(73) Assignee: HONDA MOTOR CO., LTD., Tokyo (JP)

(*) Notice: Subject to any disclaimer, the term of this patent is extended or adjusted under 35 U.S.C. 154(b) by 466 days.

(21) Appl. No.: 18/112,795

(22) Filed: Feb. 22, 2023

(65) Prior Publication Data

US 2024/0279960 A1      Aug. 22, 2024

(51) Int. Cl.
| | |
|---|---|
| *B60J 5/04* | (2006.01) |
| *B60J 5/10* | (2006.01) |
| *E05B 15/02* | (2006.01) |

(52) U.S. Cl.
CPC ........... *E05B 15/0245* (2013.01); *B60J 5/047* (2013.01); *B60J 5/105* (2013.01)

(58) Field of Classification Search
None
See application file for complete search history.

(56) References Cited

U.S. PATENT DOCUMENTS

| | | | | |
|---|---|---|---|---|
| 4,322,103 | A | * | 3/1982 | Acton ................... E05C 17/047 292/288 |
| 4,512,240 | A | | 4/1985 | Mahler et al. |
| 6,004,203 | A | | 12/1999 | Bieri |
| 6,048,005 | A | | 4/2000 | Rotondi |
| 6,176,040 | B1 | * | 1/2001 | Sugihara ............... E05C 17/206 49/394 |
| 7,988,210 | B2 | * | 8/2011 | Shibata .................. B60J 5/0487 49/394 |
| 8,469,413 | B2 | | 6/2013 | Novajovsky et al. |
| 9,004,570 | B1 | | 4/2015 | Krishnan et al. |
| 2019/0119959 | A1 | | 4/2019 | Kumar |

(Continued)

FOREIGN PATENT DOCUMENTS

| | | |
|---|---|---|
| CN | 210502212 U | 5/2020 |
| DE | 10143939 B4 | 12/2004 |

(Continued)

*Primary Examiner* — Joseph D. Pape

(74) *Attorney, Agent, or Firm* — KENEALY VAIDYA LLP

(57) ABSTRACT

An adjustable door assembly for a vehicle door can include a striker and an adjustable mechanism connected to the striker that moves the striker to any of a plurality of positions that range from a first position through a second position. The adjustable mechanism can include one of a geared mechanism and a cam lock mechanism. The geared mechanism can include a pinion gear and a rack gear engaging the pinion gear. The striker can be mounted onto the rack gear to move the striker to any of the plurality of positions. The cam lock mechanism can include a first tube, a second tube telescoping in the first tube, a locking bolt, and a lever. The lever can selectively move the locking bolt to an unlocked state that permits the second tube to telescope inside the first tube and move the striker between the first position and the second position.

20 Claims, 7 Drawing Sheets

(56)        References Cited

U.S. PATENT DOCUMENTS

2021/0102414 A1     4/2021  Meziere et al.
2022/0120117 A1     4/2022  Ottino et al.

FOREIGN PATENT DOCUMENTS

FR        3074828  B1    10/2019
JP      2004009874  A      1/2004
JP      2006062555  A      3/2006
JP        5786338  B2     9/2015
JP        6513996  B2     5/2019
KR    19980037027  U      9/1998
KR      100591529  B1     6/2006
KR      100600650  B1     7/2006
KR       101805552     *  10/2018
KR      101905552  B1    10/2018
WO      2006097230  A2     9/2006

* cited by examiner

ADJUSTABLE DOOR ASSEMBLY FOR VEHICLE DOOR, VENTILATION SYSTEM FOR OFF-ROAD VEHICLE INCLUDING SAME, AND VEHICLE

BACKGROUND

The disclosed subject matter relates to a an adjustable door assembly. More particularly, the disclosed subject matter relates to methods and apparatus that can move a door to a venting position when the door is held by a lock to expose an air inlet in the door to an airflow outside of a vehicle in order to ventilate the passenger space of the vehicle, for example, via an outlet in the door. Alternatively, the passenger space can be vented simply via an opening between the door and vehicle frame when the door is held by the lock in the venting position.

A vehicle can include one or more doors that pivot opened and closed to permit egress/ingress for vehicle occupants. The door can include a latch that locks onto a striker that is fixed onto a frame member or pillar of the vehicle when the door is in the closed position.

Vehicles can include one or more inlets in the cowl that permit a flow of ambient air outside of the vehicle into the passenger space of the vehicle. The airflow that enters the inlet(s) can be selectively directed toward an outlet or blocked by a damper or other valve structure that is controlled via the vehicle's air, ventilation and air condition system. Off-road vehicles can lack these ventilation features because the passenger space is open to the air flowing along the vehicle when the vehicle is travelling. However, off-road vehicles can include a windshield (also referred to as a windscreen) that can reduce the amount of air flowing through the passenger space.

SUMMARY

Some embodiments are directed to an adjustable door assembly for a vehicle door that can include a striker and an adjustable mechanism connected to the striker and configured to move the striker to any of a plurality of positions that range from a first position through a second position. The adjustable mechanism can include one of a geared mechanism and a cam lock mechanism. The geared mechanism can include a pinion gear and a rack gear engaging the pinion gear. The striker can be mounted onto the rack gear, and the pinion gear can selectively drive the rack gear to move the striker between the first position and the second position. The cam lock mechanism can include a first tube, a second tube, a locking bolt, and a lever. The second tube can selectively telescope inside the first tube to move the striker between the first position and the second position. The locking bolt can extend through the first tube and the second tube. The lever can pivotally connect to the locking bolt to selectively move the locking bolt between a locked state that locks the second tube to the first tube and an unlocked state that permits the second tube to telescope inside the first tube and move the striker between the first position and the second position.

Some embodiments are directed to a ventilation system for an off-road vehicle having a passenger space and a frame assembly. The frame assembly can bound the passenger space and define an opening for a passenger to ingress to the passenger space and egress from the passenger space. The ventilation system can include a striker, a door, and a vent. The striker can be configured to be movably connected to the frame assembly and selectively movable between a first position and a second position. The door can be pivotally mounted on the frame assembly and movable between a plurality of positions ranging from a closed position through an opened position, and the plurality of positions can include at least one venting position. The door can be in the closed position when the door is latched onto the striker and the striker is in the first position, such that the door obstructs ingress and egress through the opening when the door is in the closed position. The door can be in the opened position when the door is released from the striker and spaced away from the striker, such that the door permits ingress and egress through the opening when the door is in the opened position. The door can be in the venting position when the door is latched to the striker and the striker is in the second position. The vent can extend through the door and be exposed to air outside of the off-road vehicle and directs the air outside of the off-road vehicle into the passenger space when the door is in the venting position. The vent can be closed to the air outside of the off-road vehicle when the door is in the closed position.

Some embodiments are directed to a vehicle that can include a passenger space, a frame assembly, a body panel, a door, a hinge, a lock, and a vent. The frame assembly can bound the passenger space and can include an A-pillar, a B-pillar and an opening bordered by the A-pillar and the B-pillar. The body panel can be supported by the A-pillar and extend along the opening. The door can include a front end and a rear end. The hinge can connect the rear end of the door to the B-pillar, and the door pivots about the hinge between a closed position in which the door obstructs ingress to and egress from the passenger space through the opening and an opened position in which door permits ingress to and egress from the passenger space through the opening. The lock can be located adjacent the A-pillar and movable through a plurality of venting positions that range from a first position through a second position. The lock can include a locked state in which the lock holds the front end of the door in a selected one of the venting positions, and an unlocked state in which the front end of the door is released and freely pivots between the opened position and the closed position. The vent can pass through the door and be exposed to air flowing outside of the off-road vehicle so that vent directs the air flowing outside the off-road vehicle into the passenger space when the lock is in the locked state and spaced away from the first position. The body panel can close the vent to the air flowing outside of the off-road vehicle when the lock is in the locked state and in the first position.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Figure 1:
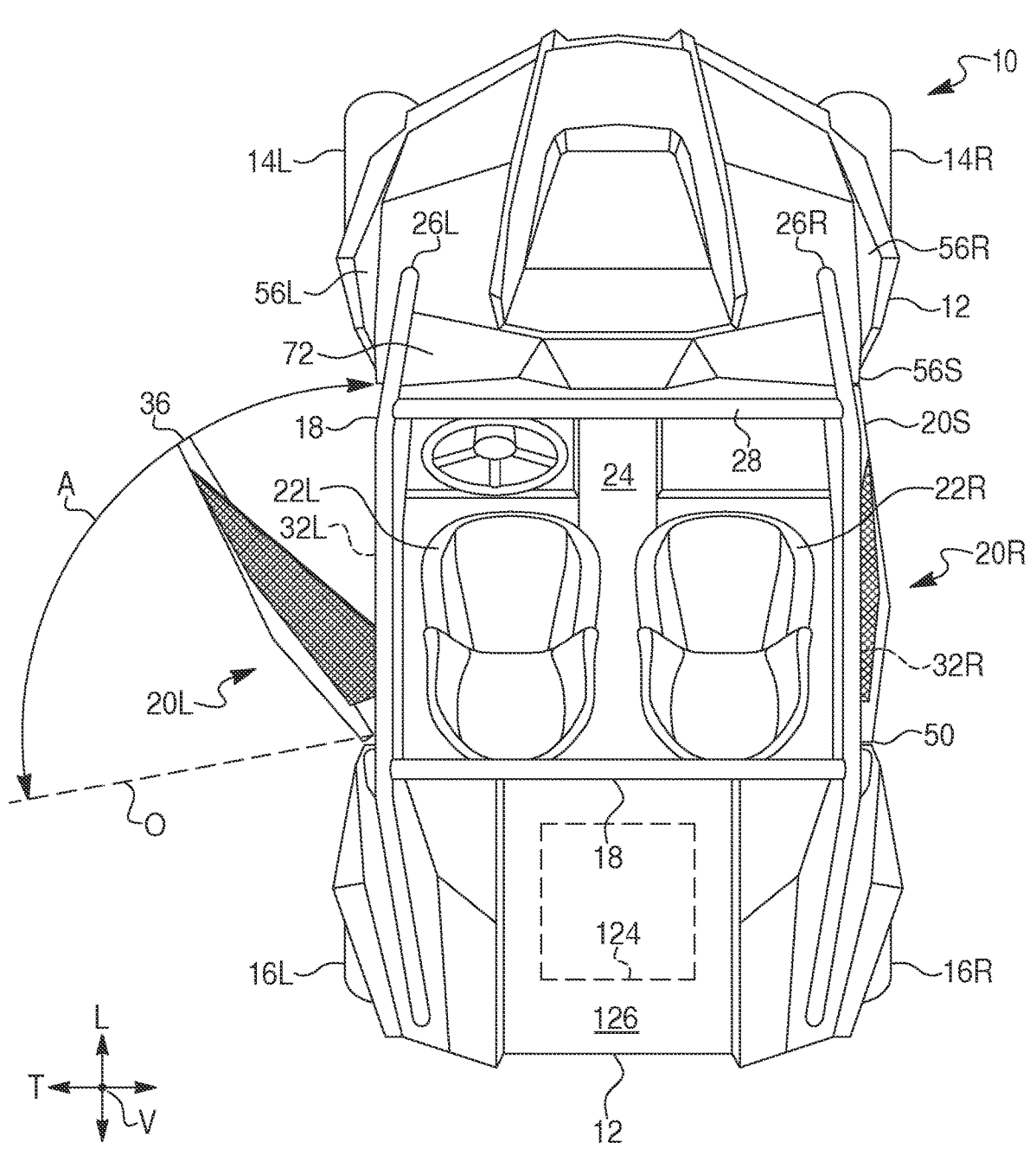
FIG. 1 is a top view of a vehicle that includes an adjustable door assembly made in accordance with principles of the disclosed subject matter.

FIG. 1 shows a vehicle 10 that can be specialized for use on an unimproved path or on an unmarked path, and can be referred to as a multipurpose utility vehicle (MUV) or as a side-by-side all-terrain vehicle (S×S, or S×S ATV). For example, embodiments are intended to include or otherwise cover any type of automobile, including a passenger car, minivan, truck, other types of all-terrain vehicle (ATV), semi-tractor, off-highway vehicle, etc.

The vehicle 10 can extend in a longitudinal direction L, a transverse direction T and a vertical direction V, which directions are orthogonal to each other. The vehicle 10 can include a body 12, a pair of doors 20L, 20R, a passenger space 24 and a frame assembly 18 that includes a pair of front frame members 26L, 26R (also referred to as A-pillars) and a front cross frame member 28. The frame assembly 18 and the body 12 can bound the passenger space 24. A windshield (omitted for clarity and simplicity of the drawing) can cover an area bounded by the body 12, the front frame members 26L, 26R and the front cross frame member 28 to obstruct the flow of air, dust, debris and liquid outside of the vehicle 10 into the passenger space 24 during operation of the vehicle 10.

Figure 2:
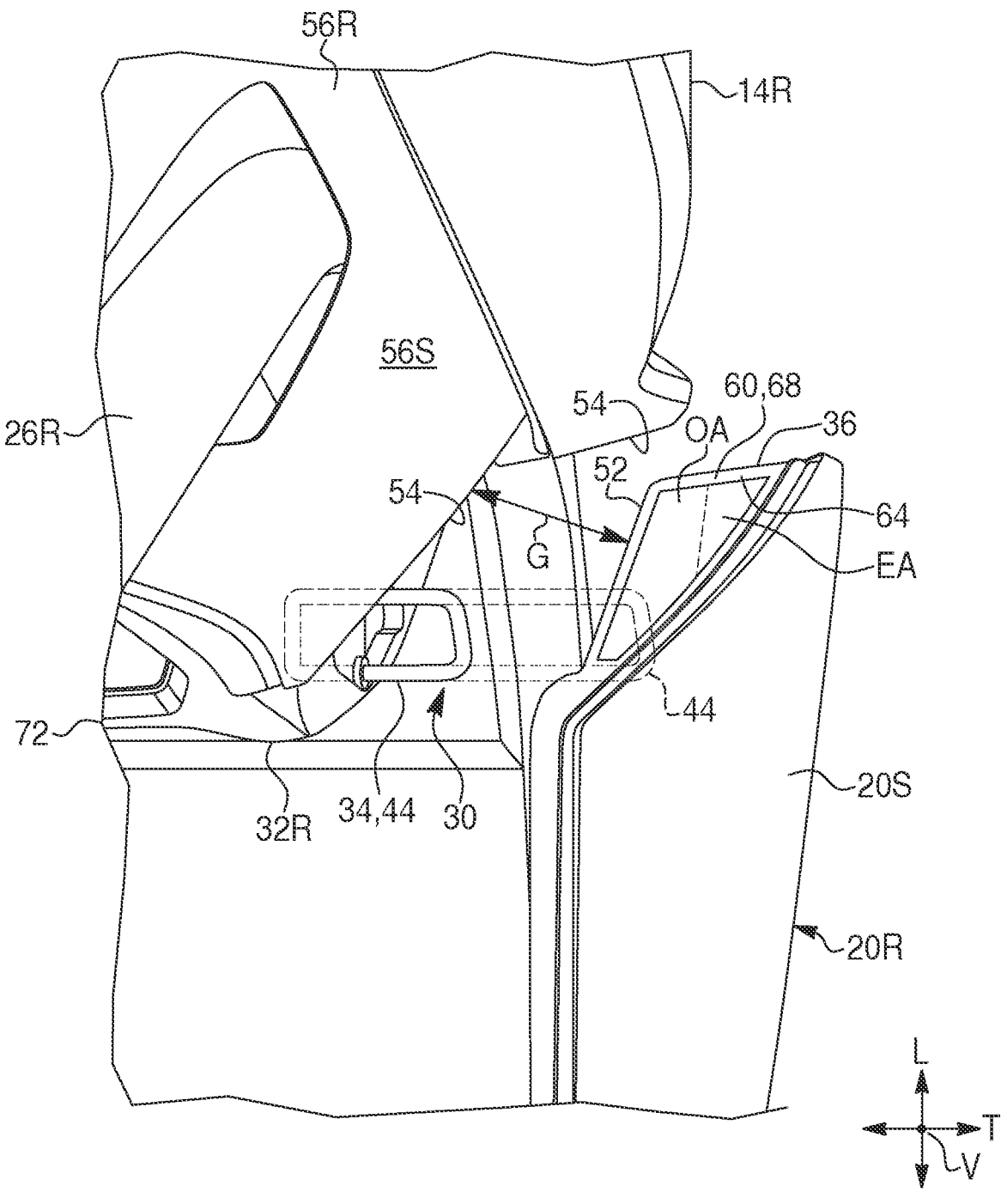
FIG. 2 is top view of a portion of the vehicle of FIG. 1 with the right side door in a venting position.
Figure 6:
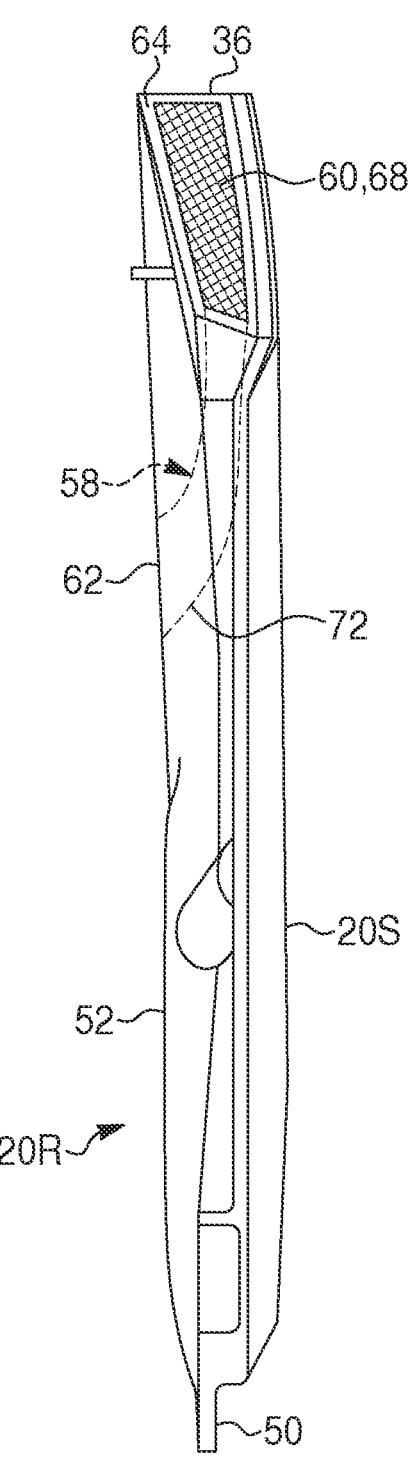
FIG. 6 is a top view of the right side door of FIG. 4.

Under certain ambient conditions, the lack of airflow through the passenger space 24 can be negatively perceived by one or more of the driver and the passenger(s). The vehicle 10 can include a respective adjustable door assembly 30 for each of the doors 20L, 20R. The doors 20L, 20R can each include a respective vent 58 (FIG. 6). Referring to FIG. 2, the adjustable door assembly 30 (which can be formed as an extendable door striker assembly) can push the front end 36 of the doors 20L, 20R out into the airflow along the side of the vehicle 10 to direct at least some of the airflow into the passenger space 24. Thus, the adjustable door assembly 30 and the vented doors 20L, 20R can increase the flow of cooling air into the passenger area 24 and maintain the advantage(s) of having the windshield mounted on the vehicle 10 while also keeping the doors 20L, 20R latched onto the respective adjustable door assembly 30. Each of the doors 20L 20R and its respective adjustable door assembly 30 can be collectively referred to as a ventilation system.

Returning to FIG. 1, each of the doors 20L, 20R can pivot through an arc A between a closed position and a fully opened position O (indicated by the dotted line). FIG. 1 shows the right side door 20R in the closed position and the left side door 20L in an opened position that is located between the closed position and the fully opened position O. The included angle measured from the closed position to the fully opened position O can be any appropriate value that provides a desired comfort level that may be perceived by the driver/passenger. FIG. 1 shows the fully opened position O forming an obtuse angle with the longitudinal direction L of the vehicle 10, and the opened position of the left side door 20L assembly 20L shown in FIG. 1 forms an acute angle with the frontward extending longitudinal direction L. However, alternate embodiments can include a fully opened position O that forms an acute angle with respect to the frontward extending longitudinal direction L of the vehicle 10, or a fully opened position O that is perpendicular to the longitudinal direction L. The door assemblies 20L, 20R can be movable to a plurality of opened positions spaced along the arc A.

The vehicle 10 can include a pair of seats 22L, 22R mounted in the passenger space 24 of the vehicle 10. The frame members 26L, 26R, 28 can be a part of a rollover protection structure configured to extend around and above the seats 22L, 22R, and the passenger area 24. The rollover protection structure can cooperate with the body 12 and/or at least a portion of the frame assembly 18 to define door openings 32L, 32R through which the driver/passenger may pass in order to ingress to or egress from the passenger space 24. The door assemblies 20L, 20R can obstruct the openings 32L, 32R to prevent ingress to and egress from the passenger space 24 when the doors 20L, 20R are in the closed position and permit ingress/egress through the openings 32L, 32R when the doors 20L, 20R are in certain of the opened positions.

The doors 20L, 20R can be placed in a venting position as shown in FIG. 2. The venting position can be between the closed position and any of the opened or fully opened positions. The vehicle 10 can include a respective lock 34 (shown schematically and in phantom in FIG. 3) for each of the doors 20L, 20R that holds a front end 36 of the respective one of the doors 20L, 20R in either the closed position or the venting position. Thus, the adjustable door assembly 30 can allow the doors 20L, 20R to direct air into the passenger space 24 while the lock 34 holds the front end 36 of the doors 20L, 20R at a predetermined position with respect to the openings 321, 32R of the vehicle 10. The venting position can also obstruct egress from the passenger space 24 through the openings 32L, 32R.

Figure 3:
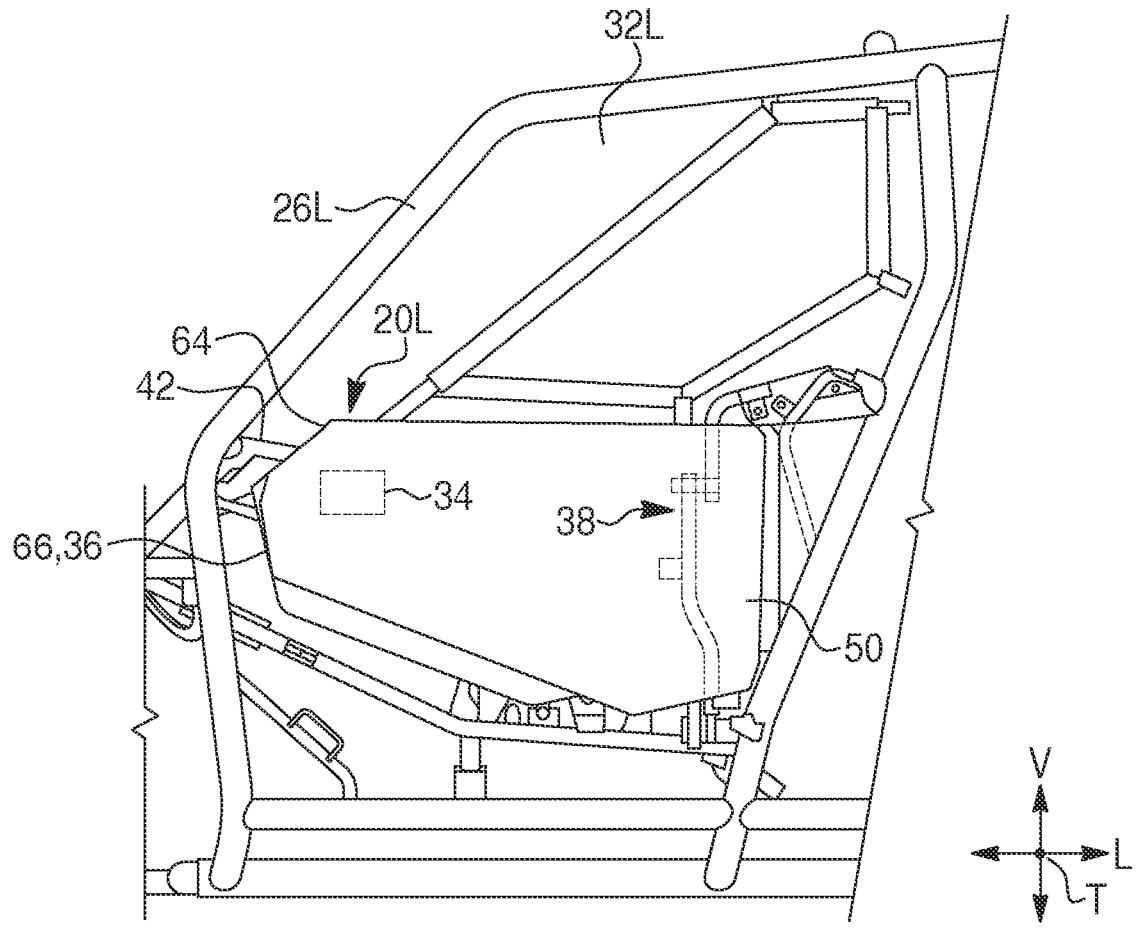
FIG. 3 is a side view of a portion of the vehicle of FIG. 1.

The adjustable door assembly 30 can be mounted to and supported by the frame 18 at any appropriate location. FIGS. 1-3 depict the doors 20L, 20R as rear-hinged doors and FIG. 2 shows the adjustable door assembly 30 mounted to the right front frame member 26R. Referring to FIG. 3, a respective bracket 42 can be mounted onto each of the front frame members 26L, 26R. The bracket 42 for the right side of the vehicle 10 can be a mirror copy of the right side bracket 42 shown in FIG. 3. The adjustable door assembly 30 can be mounted onto the bracket 42.

Referring to FIG. 3, each of the doors 20L, 20R can be mounted onto a hinge 38. FIG. 3 shows the hinge 38 for the left door 20L. The hinge for the right door 20R can be a mirror copy of the hinge 38 shown in FIG. 3. A rear end 50 of the door 20L can be mounted onto the hinge 38. The rear end 50 can be the surface at which the door 20L terminates or a portion of the door 20L that that extends from the rear end surface toward the front end 36 of the door 20L. The hinges 38 can be mounted to center frame members 40L, 40R (also referred to as B-pillars).

Details of the adjustable door assembly 30, the lock 34 and the venting position of the doors 20L, 20R are described with reference to the right door 20R. The adjustable (extendable) door assembly 30 and the lock 34 of the left door 20L can be mirror copies of the adjustable (extendable) door assembly 30 and the lock 34 of the right door 20R.

Figure 4:
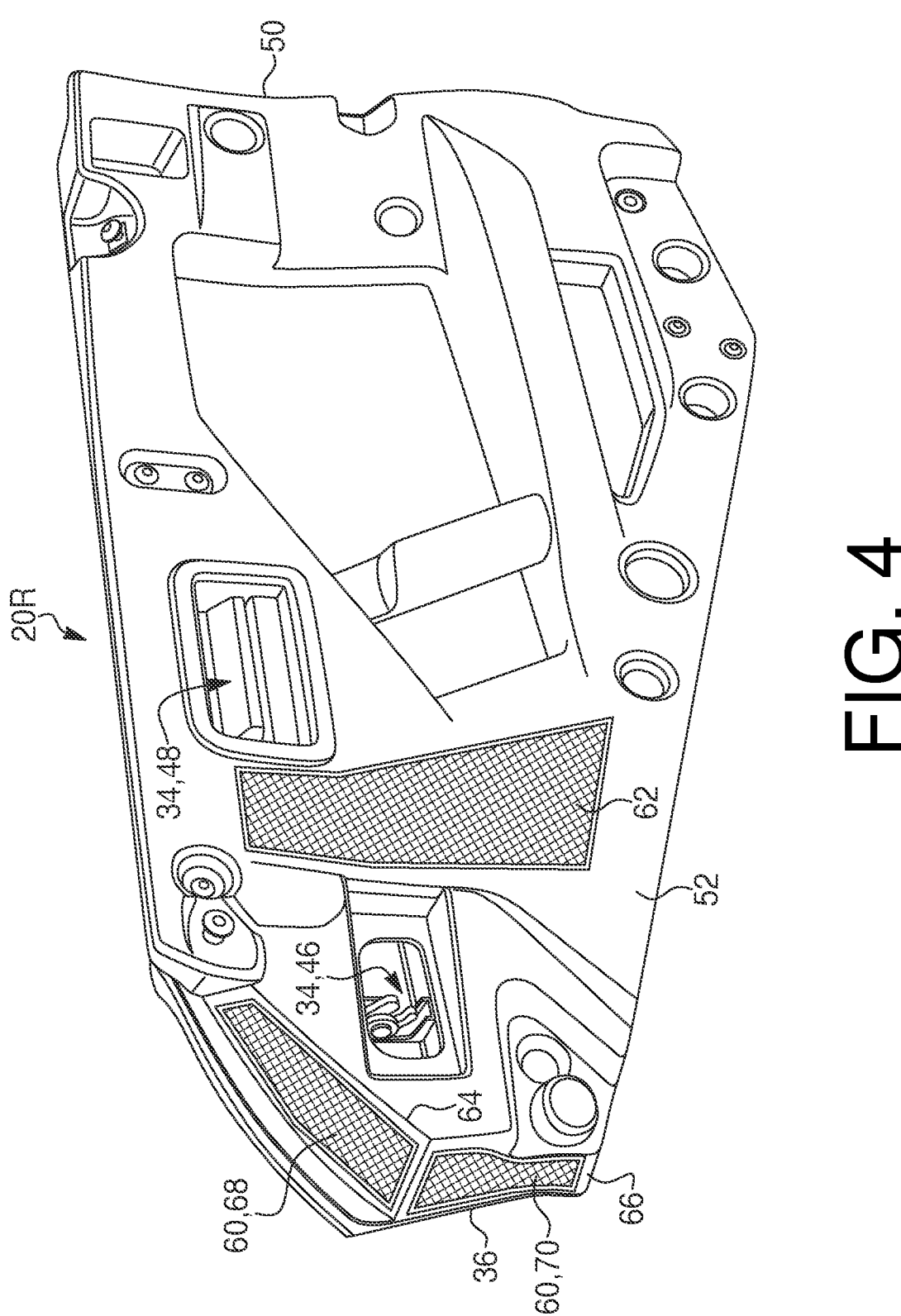
FIG. 4 is a perspective view of a right side door of the vehicle of FIG. 1.

Referring to FIGS. 2 and -43, the lock 34 can include a striker 44 and a handle 48. Referring to FIG. 4, the lock 34 can include a latch 46. The striker 44 can be a component of the adjustable door assembly 30 and the latch 46 can be mounted on the door 20R. In alternate embodiments, the placement of the striker 44, the latch 46 and the handle 48 can be reversed with the striker 44 mounted on the door, the latch 46 a component of the adjustable door assembly 30 and the handle 48 mounted on the frame assembly 18. The latch 46 can be any appropriate structure that maintains engagement with the striker 44 until a user of the vehicle 10 applies an input to the handle 48 that cause the latch 46 to disengage from the striker 44. The handle 48 can be connected to the latch 46 by any appropriate link or linkage, or by a wire or wireless communication connection to a motor that causes latch 46 to disengage from the striker 44.

Referring to FIG. 2, the adjustable door assembly 30 can move the striker 44 to any one of a plurality positions that range from a first position (solid lines) through a second position (dashed lines). When the striker 44 is in the first position and the latch 46 is locked onto the striker 44, the lock 34 can hold the door 20R in the closed position shown in FIG. 1. When the striker 44 is in the second position and the latch 46 is locked onto the striker 44, the lock 34 can hold the door 20R in the venting position shown in FIG. 2. When the latch 46 is locked onto the striker 44, the adjustable door assembly 30 can vary the size of a gap G between an inner surface 52 of the door 20R that is adjacent to the front end 36 of the door 20R and a rear end 54 of a panel of the body 12 such as one of the fenders 56L, 56R. Air flowing along the outside of the vehicle 10 can flow through the gap G and into the passenger space 24. Alternatively or in addition, air flowing along the outside of the vehicle 10 can flow through a vent opening or air inlet 60 located in a front facing panel of the door 20R (20L). FIG. 2 shows an exemplary maximum size of the gap G. The front end 36 of the doors 20L, 20R can be scoop shaped to direct air towards the passenger compartment via the gap G, or can include the above noted air inlet 60 to vent air into the passenger compartment 24 via a duct 63 running inside the doors 20R, 20L. The size of the gap G can decrease when the adjustable door assembly 30 moves the striker 44 toward the first position.

Figure 5:
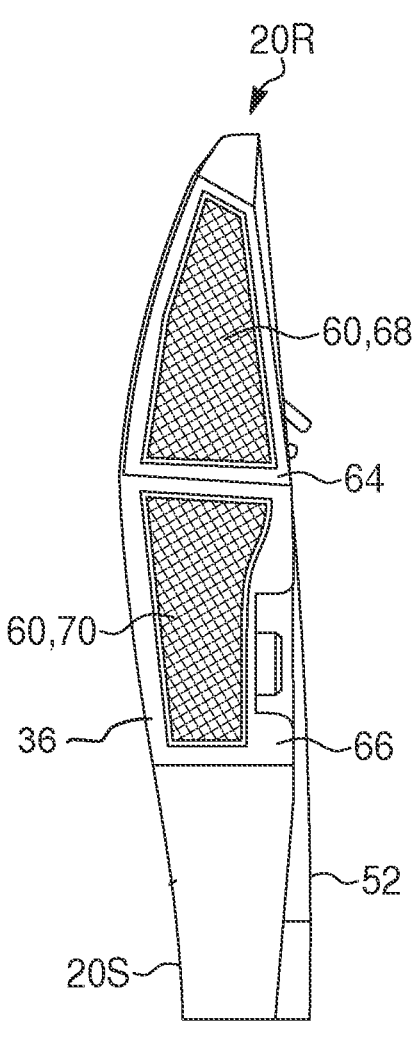
FIG. 5 is a front end view of the right side door of FIG. 4.

Referring to FIG. 5, the vent 58 can direct air flowing along the outside of the vehicle 10 to enter the passenger compartment 24 when the door 20R is in any of a plurality of venting positions. The left side door 20L can include a vent that is a mirror copy of the vent 58.

Referring to FIGS. 4-6 collectively, the front end 36 of the door 20R can include two angled surfaces 64, 66. The upper surface 64 can be inclined upwardly in the vertical direction V of the vehicle 10 and inclined relative to the longitudinal direction L of the vehicle 10. The lower surface 66 can be inclined downwardly in the vertical direction V of the vehicle 10 and inclined relative to the longitudinal direction L of the vehicle 10.

The inner surface 52 of the door 20R can extend from the front end 36 to the rear end 50 along the longitudinal direction L of the vehicle 10. The latch 46 and the handle 48 can be located in a recess in the inner surface 52. The latch 46 can be located adjacent to the front end 36 of the door 20R and between the front end 36 and the handle 48. The inner surface 52 can extend along the longitudinal direction L and the vertical direction V of the vehicle 10.

The vent 58 can include an air inlet 60, an air outlet 62 and a duct 63 (in phantom in FIG. 5) that connects the air inlet 60 to the air outlet 62. The air inlet 60 can include an upper inlet 68 and a lower inlet 70. The upper inlet 68 can pass through the upper surface 64 and extend in each of the longitudinal direction L, the transverse direction T and the vertical direction V of the vehicle 10. The lower inlet 70 can pass through the lower surface 66 and extend in each of the longitudinal direction L, the transverse direction T and the vertical direction V. The inlets 68, 70 can generally face the longitudinal direction L toward the front end of the vehicle 10.

The air outlet 62 can pass through the inner surface 52 of the doors 20L, 20R. The air outlet 62 can extend along the longitudinal direction L and the vertical direction V of the vehicle 10. The air outlet 62 can face the transverse direction T. The air outlet 62 can be located between the latch 46 and the handle 48 with respect to the longitudinal direction L. However, alternate embodiments can locate the air outlet 62 at any appropriate position that can direct air flowing through the vent 58 to flow toward a passenger in the right seat 22R (or left seat 22L), as desired for a particular application.

The duct 62 can be curved with respect to the longitudinal direction L and the transverse direction T so that the direction of the airflow that enters the air inlet 60 along the longitudinal direction L is redirected to flow into the passenger space 24 along the transverse direction T.

The air inlet 60 and the air outlet 62 can be covered by a screen, mesh or other filter than prevents or at least restricts debris or other items from passing into or through the vent 58.

Each of the inlets 68, 70 can have a respective total area. When the latch 46 is locked onto the striker 44 and the adjustable door assembly 30 moves the lock 34 between the first position and the second position, the adjustable door assembly 30 can vary the percentage of the total area that is exposed to the air flowing along the outside of the vehicle 10.

Returning to FIG. 2, a dotted line symbolically demarcates an exemplary obstructed area OA and an exemplary exposed area EA. The total area is equal to the sum of the obstructed area OA and the exposed area EA when the lock 34 is spaced away from both of the first position and the second position. The exposed EA can increase as the adjustable door assembly 30 moves the lock 34 toward the second position and the obstructed area OA can increase as the adjustable door assembly 30 moves the lock 34 toward the first position. The obstructed area OA can be equal to the total area when the lock 34 is in the first position and the exposed area EA can be equal to the total area when the lock 34 is in the second position. Thus, the occupant of the right seat 22R can vary the flow rate of air that enters the inlet 60 and exits the outlet 62.

The door 20R can include an outer surface 20S and the fender 56R can include an outer surface 56S that is flush or substantially flush with the outer surface 20S when the door 20R is in the closed position shown in FIG. 1. The surfaces 20S, 56S can extend along the longitudinal direction L. The outer surfaces 20S, 56S can be aligned with each other in the transverse direction T when the door 20R is in the closed position. The outer surfaces 20S, 56S can extend between the air inlet 60 and the airflow along the outside of the vehicle 10 when the door 20R is in the closed position thereby closing the air inlet 60 to the airflow.

Figure 7:
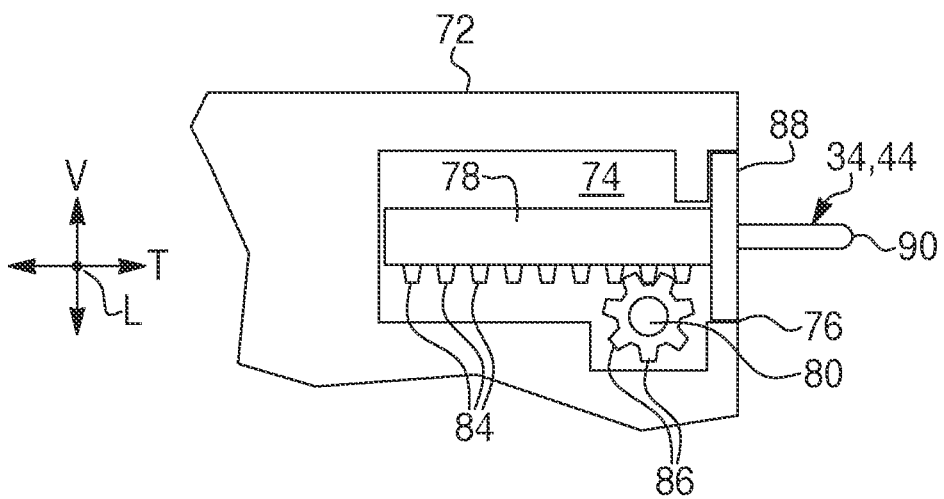
FIG. 7 is a schematic view of a first embodiment of an adjustable mechanism for an extendable door striker assembly made in accordance with principles of the disclosed subject matter.
Figure 8:
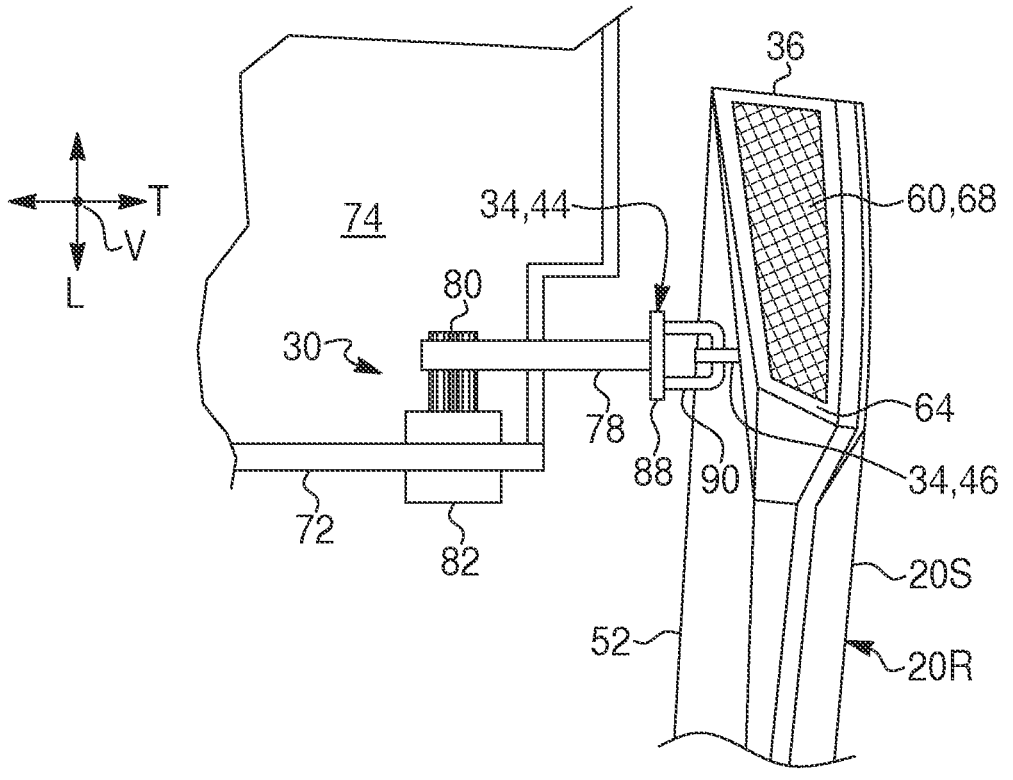
FIG. 8 is a top view of the right side door of FIG. 1 and the adjustable mechanism of FIG. 7.

Referring to FIG. 1, the vehicle 10 can include an instrument panel 72 (also referred to as a dashboard) that extends from each of the front frame members 26L, 26R in the transverse direction T. The instrument panel 72 can extend along a portion of the door openings 32L, 32R as shown in FIG. 2. Referring to FIGS. 7 and 8 collectively, the instrument panel 72 can include an interior space 74 and an opening 76.

The adjustable door assembly 30 can be housed in the interior space 74 and extend through the opening 76 when the adjustable door assembly 30 moves the lock 34 between the first position and the second position. The adjustable door assembly 30 can include any structure that can support and move the lock 34 between the first position and the second position. FIGS. 7-8 show an adjustable door assembly 30 that is configured as a geared mechanism.

The adjustable door assembly 30 can include an extension 78, a pinion gear 80 and a knob 82. The extension 78 can be configured as a rack gear with gear teeth 84 integrally formed on the extension. The pinion gear 80 can include teeth 86 that mesh with the teeth 84 of the rack gear 78. The pinion gear 80 and the knob 82 can be rotatably support by the instrument panel 72 in any appropriate manner that allows the knob 82 and the pinion gear 80 to rotate with respect to the instrument panel 72. The pinion gear 80 can be connected to the knob 82 in any appropriate manner that permits the pinion gear 80 to rotate in unison (or in ratio or correspondence) with the knob 82. The knob 82 can pass through the instrument panel 72. The knob 82 can include any appropriate mechanism or structure that can stop rotation of the knob 82 after the user has placed the lock 34 in the desired position in the range from the first position through the second position.

The striker 44 can be mounted onto the rack gear 78 in any appropriate manner such as, but not limited to, mechanical fastener(s), weld(s), adhesive, etc. The striker 44 can include a plate 88 and a U-shaped hook 90 that is connected onto the plate in any appropriate manner such as, but not limited to, mechanical fasteners, welds, adhesive, etc. The plate 88 can close the opening 76 in the instrument panel 72 when the striker 44 is in the first position. Any of the above structures 44, 78, 88, 90 can be integrally formed instead of connected to each other.

When a user rotates the knob 82, the pinion gear 80 can drive the rack gear 78 in the transverse direction T to move the striker 44 (and the attached latch 46 and door 20L, 20R) between the first and second positions. The gear ratio for the gear mechanism can be set at any appropriate value that can provide the user with a perceived satisfaction for the adjustment control and positioning of the doors 20L, 20R into the desired venting position.

Figure 9:
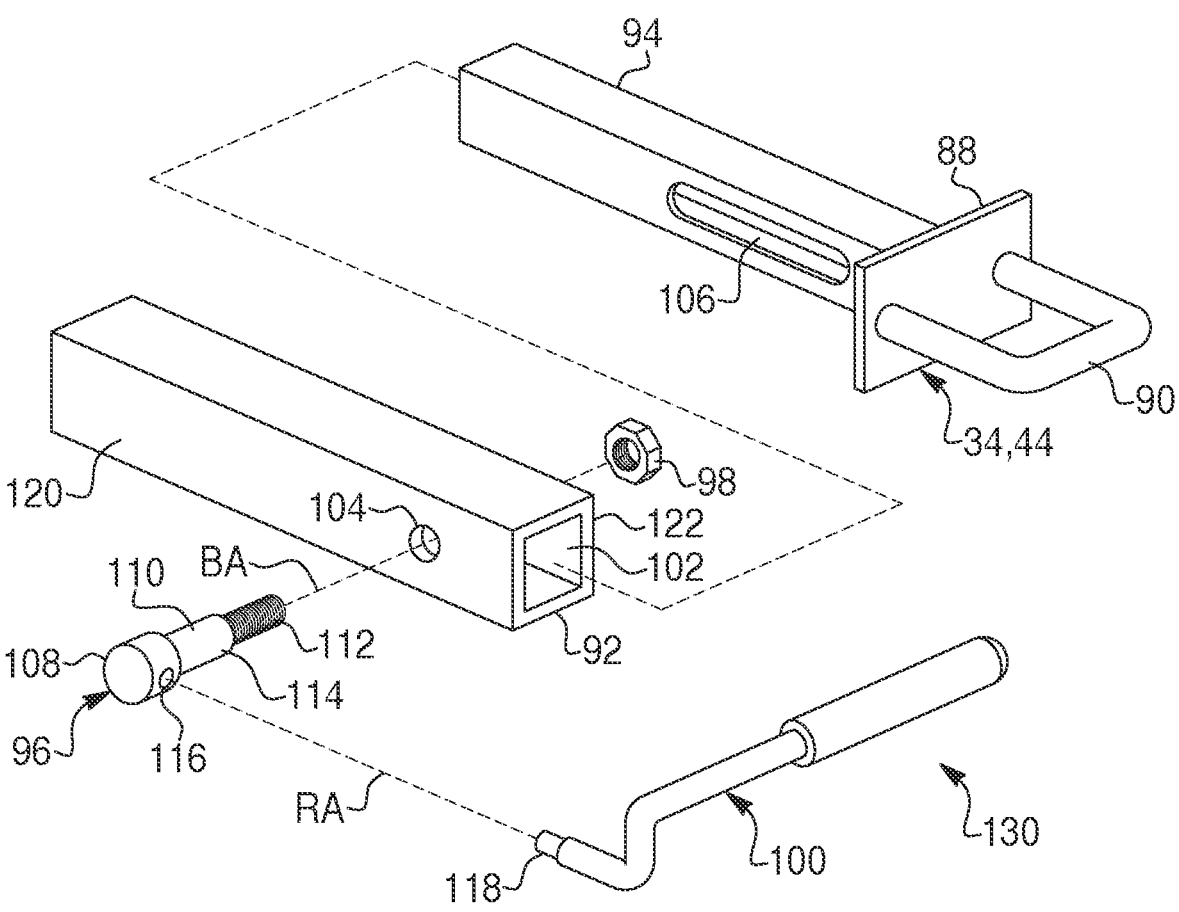
FIG. 9 is a perspective view of a second embodiment of an adjustable mechanism for an extendable door striker assembly made in accordance with principles of the disclosed subject matter.

FIG. 9 shows an adjustable door assembly 130 according to a second embodiment. The adjustable door assembly 130 can be housed in the interior space 74 (see FIGS. 7 and 8) of the instrument panel 72. The adjustable door assembly 130 can be configured as a cam lock mechanism that includes a support tube 92, an extension 94, a locking bolt 96, a nut 98 and a lever 100. The extension 94 can also be referred to as a telescoping tube.

The tubes 92, 94 can be hollow and rectangular in cross-section. The support tube 92 can be secured to the instrument panel 72 and/or the front frame member 26R in any appropriate manner such as, but not limited to, mechanical fasteners, welds, adhesive, etc. The support tube 92 can include an opening 102. The telescoping tube 94 can extend through the opening 102 and into the hollow interior of the support tube 92. The telescoping tube 94 can slide into and out of the support tube 92 and move through the opening 76 in the instrument panel 72 in order to move the lock 34 between the first position and the second position. The plate 88 of the striker 44 can be mounted onto the telescoping tube 94 in any appropriate manner such as, but not limited to, mechanical fastener(s), weld(s), adhesive, integrated therewith, etc.

The support tube 92 can include a pair of bolt holes 104 that oppose each other. The second bolt hole is obstructed from view in FIG. 9. The telescoping tube 94 can include a pair of elongated holes 106 that are opposed to each other and that are aligned with the bolt holes 104 when assembled. The second elongate hole 106 is obstructed from view in FIG. 9. The locking bolt 96 can pass through all of the holes 104, 106 and can engage the elongated holes 106 to delimit the first position and the second position of the lock 34.

The locking bolt 96 can include a head 108, a smooth shaft 110 and a thread shaft 112. The head 108 can have a first outer diameter, the smooth shaft 110 can have a second outer diameter that is smaller than the first outer diameter, and the threaded shaft 112 can have a third outer diameter that is smaller than the second outer diameter. The inner diameter of the holes 104 can be smaller than the first outer diameter and larger than the second outer diameter. The elongated hole 106 that is visible in FIG. 9 can be dimensioned larger than the second outer diameter so that the smooth shaft 110 can pass through. The opposing elongated hole obstructed from view in FIG. 9 can be dimensioned smaller than the second diameter and larger than the third diameter so that an end face 114 of the smooth shaft 110 can abut an inner surface of the telescoping tube 94.

In one embodiment, the shaft 110 is movable with respect to shaft 112. The head 108 includes a camming structure located therein that is connected to shaft 112 to move shaft 112 along the bolt axis BA of the shafts 110 toward and away from the head 108. The head 108 can include an opening 116 and the lever 100 can include a pin 118 that extends through the opening 116 and engages the camming mechanism. When a user pivots the lever 100 about the rotation axis RA, the pin 118 can rotate the camming mechanism, which in turn, causes the shaft 112 to move toward or away from the head 108 along the bolt axis BA.

The head 108 abuts the outer surface of the support tube 92 on a first side 120 of the support tube 92 and the threaded shaft 112 protrudes through the bolt hole (obstructed from view) in a second side 122 of the support tube 92. The nut 98 can be tightened onto the threaded shaft 112 to tightly engage the outer surface of the second side 122. Thus, the telescoping tube 94 can be clamped between the end face 114 and the second side 122.

Thus, when the telescoping tube 94 is not locked with respect to the support tube 92, the striker 44 can be moved such that the adjustable door assemblies 30, 130 can easily move the doors 20L, 20R into and out of a venting position. The telescoping tube 94 can similarly be locked with respect to the support tube 92 to hold the doors 20L, 20R in the desired venting position and/or closed position.

Returning to FIG. 1, the vehicle 10 can include a pair of front wheels, 14L, 14R, a pair of rear wheels 16L, 16R, and a powertrain 124. The powertrain 124 is schematically illustrated in FIG. 1. The powertrain 124 can generate torque and be configured to distribute the torque to drive only the front wheels 14L, 14R, or configured to drive only the rear wheels 16, or configured to drive all of the wheels 14L, 14R, 16L, 16R. The powertrain 124 can include a power source configured as an internal combustion engine, an electric motor or a hybrid of an internal combustion engine and an electric motor. The powertrain 124 can include a multiple speed ratio gear transmission that is driven by the power source. The transmission can be omitted from a powertrain that includes an electric motor or replaced by a single speed ratio gear transmission.

The front fenders 56L, 56R can extend along the front wheels 14L, 14R. The body 12 can include one or more panels that form a cargo/storage space 126 at the rear of the vehicle 10. The powertrain 124 can be mounted to the frame assembly 18 at a location that is underneath the cargo/ storage area 126.

The frame assembly 18 can be configured to support the body 12, door assemblies 20L, 20R, seats 22L, 22R, suspension components for the wheels 14L, 14R, 16L, 16R, powertrain 124, steering system, control pedal assemblies, passengers and cargo items, for example. The frame assembly 18 can be configured to withstand various modes of operation, including operation on unimproved paths, and can be configured to surround the passenger area. The frame assembly 18 can define the passenger space 24 of the vehicle 10. The frame assembly 18 can also provide an overall bending stiffness and torsional stiffness characteristic for the vehicle 10 that can be advantageous for rugged terrain of an unimproved path.

The frame assembly 18 can be made from any appropriate structural element(s), such as but not limited to tubes, pipes, beams, stampings, etc., that can provide sufficient strength and rigidity for the vehicle 10 including the vehicle passenger area. The frame assembly 18 can be formed from a single type of structural element, or alternatively the frame member 18 can be formed from any combination of structural elements. The structural elements can have any appropriate cross-sectional shape, such as but not limited to circular, rectangular, regular polygonal, irregular polygonal, hollow, and/or solid. The structural elements can be variable in material and geometry along the length of the structural element, etc.

While certain embodiments of the invention are described above, it should be understood that the invention can be embodied and configured in many different ways without departing from the spirit and scope of the invention.

For example, embodiments are disclosed above in the context of a rear-hinged door with a movable lock. However, alternate embodiments can include a front-hinged door that includes a movable hinge that pushes the front end of the door into the airflow along the side of the vehicle. For example, the hinge could be connected to the A-pillar by an extendable mechanism of FIGS. 7 and 8 or of FIG. 9. In another alternate embodiment, the hinge can include a pair of hinge plates connected to each other by a first hinge pin, with the first plate connected to the a hinge pin mounted onto the frame assembly and a second plate mounted onto the door.

FIG. 2 shows an exemplary maximum gap G. Alternate embodiments of the adjustable door assembly 30 provide a larger gap as compared to FIG. 2. These alternate embodiments can push the front end 36 of the doors 20L, 20R outward along the arc A so that the inner surface 52 protrudes beyond the front wheels 14L, 14R with respect to the transverse direction T.

Instead of the striker 44 being mounted onto the extensions 78, 94 the latch 46 can be mounted onto either of the extensions 78, 94 and the striker 44 can be mounted onto the doors 20L, 20R.

In alternate embodiments, the rack gear 78 and can be assembled from a separate extension member and a rack gear in any appropriate manner.

In alternate embodiments, a plurality of holes spaced apart from each other can replace the elongated holes 106 and a retractable pin can replace the locking bolt 96. The pin can be secured to the support tube 92 and movable relative to the tubes 92, 94.

The vehicle can be a rear mount engine as shown in FIG. 1, but it is contemplated that mid mount and front mount engines can be employed in the vehicle 10 without departing from the scope of the disclosed subject matter. In addition, although examples of the lock 34 or adjustable door assembly 30 are depicted as a rack and pinion device and a camming device, various other linkages, camming devices, geared structures, stepper motors, and even pneumatic or hydraulic piston structures can be employed to move the door assemblies 30 from the closed position to the venting position and comprise the lock 34. The lock 34 can include or be formed as an adjustable mechanism. In addition, it is contemplated that a single or multiple ducts 63 can lead from the air inlet 60 in the front of the door 20L, 20R to any location within the vehicle 10 at which a passenger or driver might desire air flow for comfort, drying or other purposes.

What is claimed is:

1. An adjustable door assembly for a vehicle door comprising:
   a striker; and
   an adjustable mechanism connected to the striker and configured to move the striker to any of a plurality of positions that range from a first position through a second position, the adjustable mechanism includes,
   a first tube,
   a second tube that selectively telescopes inside the first tube to move the striker between the first position and the second position,
   a locking bolt extending through the first tube and the second tube, and
   a lever pivotally connected to the locking bolt to selectively move the locking bolt between a locked state that locks the second tube to the first tube and an unlocked state that permits the second tube to telescope inside the first tube and move the striker between the first position and the second position.

2. An adjustable door assembly comprising:
   a striker; and
   an adjustable mechanism connected to the striker and configured to move the striker to any of a plurality of positions that range from a first position through a second position, the adjustable mechanism includes,
   a pinion gear,
   a rack gear engaging the pinion gear, the striker is mounted onto the rack gear, the pinion gear selectively drives the rack gear to move the striker between the first position and the second position, and
   a knob coupled to the pinion gear and selectively rotating the pinion gear to drive the rack gear.

3. The adjustable door assembly according to claim 1, wherein
   the first tube includes a pair of through holes aligned with each other,
   the second tube includes a pair of elongated slots aligned with each other and with the through holes, and
   the locking bolt passes through the through holes and the elongated slots.

4. The adjustable door assembly according to claim 1, wherein
   the striker is mounted onto the second tube.

5. The adjustable door assembly according to claim 1, wherein the striker includes, a plate mounted onto the second tube, and a U-shaped hook connected to and extending from the plate.

6. A ventilation system for an off-road vehicle having a passenger space and a frame assembly, the frame assembly bounding the passenger space and defining an opening for a passenger to ingress to the passenger space and egress from the passenger space, the ventilation system comprising:

the adjustable door assembly according to claim 1;

a hinge configured to pivotally connect the door to the frame assembly;

a door having a first end and a second end, the first end is mounted onto the hinge, the door pivots about the hinge through an arc that extends between a closed position and a fully opened position;

a latch mounted onto the door adjacent to the second end, the door is in the closed position when the striker is in the first position and the latch is locked onto the striker, the door is in the fully opened position when the latch is released from the striker, and the door is in a venting position when the latch is locked onto the striker and the striker is spaced away from the first position, the venting position is spaced away from both of the closed position and the fully opened position.

7. The ventilation system according to claim 6, wherein the door includes an air inlet at the second end and an air outlet spaced away from the first end and the second end, the air inlet is at least partially exposed to air flowing along the off-road vehicle when the off-road vehicle is traveling and the door is in the venting position.

8. The ventilation system according to claim 7, wherein the air inlet faces a first direction, and the air outlet faces a second direction that intersects the first direction.

9. The ventilation system according to claim 6, wherein the door includes, an outer wall, an inner wall spaced away from the outer wall, an end wall connected to and extending from each of the outer wall and the inner wall, an air inlet in the end wall configured such that air enters the inlet when the door is in the at least one venting position and the off-road vehicle is traveling forward, and an air outlet in the inner wall configured such that air flowing into the air inlet exits the air outlet.

10. The ventilation system according to claim 6, wherein the door includes, a handle connected to the latch and movable to selectively unlock the latch from the striker when the door is in the closed position, an air inlet spaced away from the door handle, an air outlet located between the air inlet and the handle, and an air duct connected to and extending from each of the air inlet and the air outlet.

11. A ventilation system for an off-road vehicle having a passenger space and a frame assembly, the frame assembly bounding the passenger space and defining an opening for a passenger to ingress to the passenger space and egress from the passenger space, the ventilation system comprising:

a striker configured to be movably connected to the frame assembly and selectively movable between a first position and a second position;

a door pivotally mounted on the frame assembly and movable between a plurality of positions ranging from a closed position through an opened position, the plurality of positions includes at least one venting position, the door is in the closed position when the door is latched onto the striker and the striker is in the first position, such that the door obstructs ingress and egress through the opening when the door is in the closed position, the door is in the opened position when the door is released from the striker and spaced away from the striker, such that the door permits ingress and egress through the opening when the door is in the opened position, the door is in the venting position when the door is latched to the striker and the striker is in the second position; and a vent extending through the door, the vent is exposed to air outside of the off-road vehicle and directs the air outside of the off-road vehicle into the passenger space when the door is in the venting position, and the vent is closed to the air outside of the off-road vehicle when the door is in the closed position.

12. The ventilation system according to claim 11, wherein the vent includes an air inlet that faces a first direction, and an air outlet that faces in a second direction that is at an angle greater than zero with respect to the first direction.

13. The ventilation system according to claim 11, wherein the striker is movable to any of a plurality of positions that are spaced away from the first position, and the plurality of positions include the second position.

14. A vehicle comprising:

a passenger space;

a frame assembly bounding the passenger space and including an A-pillar, a B-pillar and an opening bordered by the A-pillar and the B-pillar;

a body panel supported by the A-pillar and extending along the opening;

a door including a front end and a rear end;

a hinge connecting the rear end of the door to the B-pillar, the door pivots about the hinge between a closed position in which the door obstructs ingress to and egress from the passenger space through the opening and an opened position in which door permits ingress to and egress from the passenger space through the opening;

a lock located adjacent the A-pillar and movable through a plurality of venting positions that range from a first position through a second position, the lock includes a locked state in which the lock holds the front end of the door in a selected one of the venting positions, the lock includes an unlocked state in which the front end of the door is released and freely pivots between the opened position and the closed position; and a vent passing through the door, the vent is exposed to air flowing outside of the off-road vehicle and directs the air flowing outside the off-road vehicle into the passenger space when the lock is in the locked state and spaced away from the first position, and the body panel closes the vent to the air flowing outside of the off-road vehicle when the lock is in the locked state and in the first position.

15. The vehicle according to claim 14, wherein the A-pillar is a first A-pillar,

the frame assembly further includes a second A-pillar that is spaced away from the first A-pillar in a transverse direction of the off-road vehicle and aligned with the first A-pillar in a longitudinal direction, the body panel includes a panel outer surface that extends in the longitudinal direction, the door includes a door outer surface that is aligned with the panel outer surface in the transverse direction when the door is in the closed position, and the vent includes an inlet in the door, the inlet extends outwardly of the panel outer surface in the transverse direction and directs the air flowing outside the off-road vehicle into the passenger space when the lock is in the locked state and spaced away from the first position.

16. The vehicle according to claim 15, wherein the vent further includes an outlet on the door, the outlet faces in the transverse direction and directs the air in the vent to flow into the passenger space.

17. The vehicle according to claim 15, further comprising:

an instrument panel connected to and extending from the first A-pillar and the second A-pillar, the instrument panel includes an opening facing the transverse direction; and an extension movably supported on one of first A-pillar and the instrument panel, and the extension moves through the opening to move the lock between the first position and second position, wherein the lock includes, a striker mounted onto the extension, the striker closes the opening when the striker is in the first position, the striker is spaced away from the opening in the transverse direction when the striker is in the second position, and a latch mounted on the door, the latch is locked onto the striker when the lock is in the locked state, and the latch is released from the striker when the lock is in the unlocked state.

18. The vehicle according to claim 17, further comprising, a pinion gear rotatably supported inside the instrument panel, wherein the extension is a rack gear engaging the pinion gear, and the pinion gear selectively drives the rack gear to move the striker between the first position and the second position.

19. The vehicle according to claim 14, wherein the striker is movable between a plurality of positions between the first position and the second position, the vent includes an air inlet that has a total area, the total area has a blocked area and an exposed area when the lock is in the locked state and the lock is spaced away from both of the first position and the second position, and a size of the exposed area varies as the lock moves between the first position and the second position such that, the size of the exposed area is less than the total area when the striker in spaced away from the second position, the size of the exposed area is equal to the total area when the lock is in the second position, and the blocked area is equal to the total area when the lock is in the first position.

20. The vehicle according to claim 14, wherein a variable gap extends between the body panel and the door when the lock is spaced away from the first position and in the locked state, and the door directs air flowing outside of the vehicle into passenger space by way of the gap when the lock is spaced away from the first position and in the locked state.

* * * * *